Apr. 10, 1923.
J. HOCHMAN
QUICK STOP EMERGENCY BRAKE FOR VEHICLES
Filed Feb. 6, 1922
1,451,336
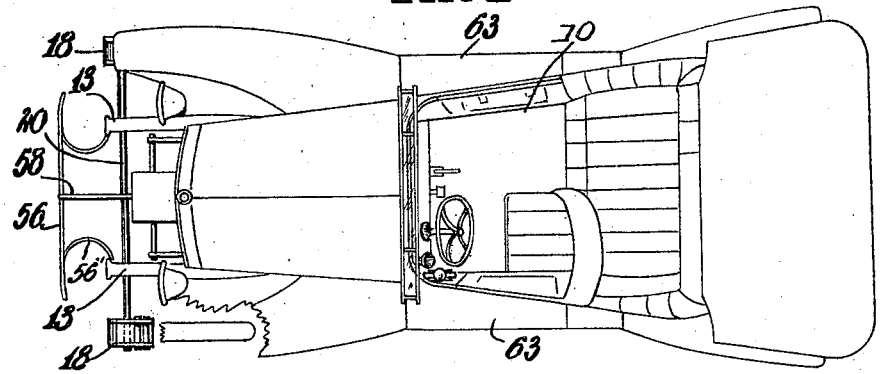
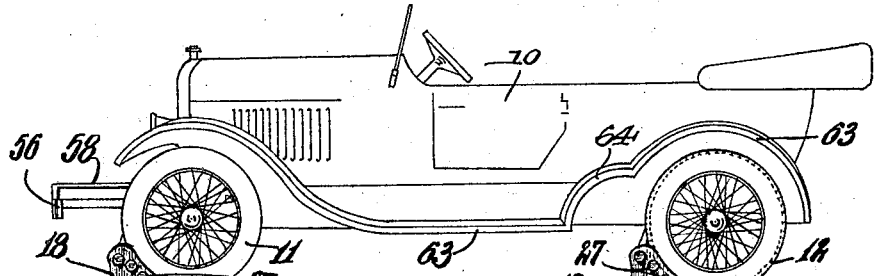
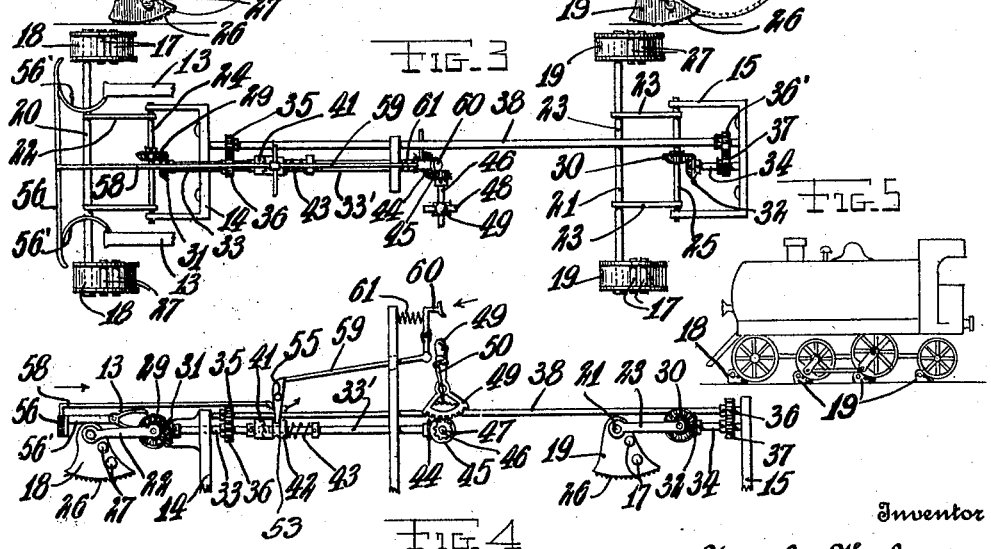
Inventor
Jacob Hochman
By Zoltan Polachek
Attorney Patented Apr. 10, 1923.

1,451,336

UNITED STATES PATENT OFFICE.

JACOB HOCHMAN, OF NEW YORK, N. Y.

QUICK-STOP EMERGENCY BRAKE FOR VEHICLES.

Application filed February 6, 1922. Serial No. 534,486.

*To all whom it may concern:*

Be it known that I, JACOB HOCHMAN, citizen of Hungary, residing at New York, in the county of New York and State of New York, have invented certain new and useful Improvements in Quick-Stop Emergency Brakes for Vehicles, of which the following is a specification.

This invention relates to a quick-stop emergency brake for automobiles, trains, train-cars, or vehicles generally.

The invention has for an object to provide a novel form of brake comprising a shoe which is moved into engagement with the ground or rail just in front of the vehicle wheel, and further to cause the shoe to so move when the vehicle strikes an object.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of an automobile provided with my improved quick-stop brakes.

Fig. 2 is a side view thereof.

Fig. 3 is a detail plan view showing the arrangement of the brake shoes and their control means.

Fig. 4 is a side view of the parts shown in Fig. 3.

Fig. 5 is a side view of a railway locomotive equipped with my improved brakes.

In Figs. 1 and 2 of the drawings I have shown an automobile whose body is indicated generally at 10, the front and rear wheels being shown at 11 and 12, and the main side frame members at 13. Suitably connected to these side frame members 13 are front and rear brackets 14 and 15 respectively which serve to support the brake shoes and their control mechanism.

To engage the ground I provide a front pair of brake elements 18 and a rear pair 19 located adjacent the front and rear pair of wheels respectively. These brake elements are of roughly triangular shape as seen in side view and are suspended from front and rear bodily movable transverse shafts 20 and 21. These shafts are mounted on the forward ends of pairs of arms 22 and 23 which are fixed on shorter transverse shafts 24 and 25 mounted in the brackets 14, 15.

The bottom faces of the brake elements are preferably rounded longitudinally as shown and serrated as at 26 to better grip the ground. At their inclined rear sides these brake elements are provided with rollers 27.

Fixed on the shafts 24 and 25 are bevel gears 29 and 30 meshing with like gears 31 and 32 fixed on alined longitudinal shafts 33 and 34. On these shafts 33, 34 are spur gears 36 and 37 meshing with like gears 35 and 36' on a longitudinal shaft 38 which unites the control mechanisms of the front and rear brake elements.

Fixed on the shaft 33 is a clutch member 41 engaged by a second clutch member 42 feathered on an alined and meeting shaft 33' and held in engagement with the first clutch member by a coiled expansion spring 43. This latter shaft 33' has fixed to its rear end a bevel gear 44 engaged by a like gear 45 on a transverse rock shaft 46 on which is fixed a spur pinion 47 engaged by a gear segment 48 having an integral operating handle 49 and provided with the usual adjustable bolt and sector locking means indicated at 50. This handle 49 is operated to raise the brake members 18, 19 from operative position.

The brake members are normally carried in the raised position shown in Fig. 4, means being provided whereby they may be released either by the driver of the vehicle, or when an object is struck. As here shown a groove 53 is formed in the feathered clutch member 42 and is engaged by one end of a short lever 54 fulcrumed between its ends as at 55 to a suitable fixed part. Extending transversely in front of the vehicle is a bumper bar 56 connected at its ends by the curved spring elements 56' with the forward ends of the frame members 13. Fixed to, and extending rearwardly from, this bar is a suitably guided thrust rod 58 whose rear end abuts against the lower arm of lever 54. Connected to the upper arm of lever 54 is a rigid link 59 which extends rearwardly to connect to a foot operated lever 60, held inoperative by a spring 61.

In order to enable the rear brake elements 19 to be raised without striking the rear mud guards 63 of the automobile, when applied to this type of vehicle, the mud guards are projected forwardly as at 64 to present recesses in which the said brake elements are received when in raised position.

The manner of use and operation of my improved quick-stop brake is as follows: Normally the parts occupy the position shown in Figs. 3 and 4. By the connections above described the brake members are held, against falling, by the lock device 50. If the bumper bar 56 strikes an object the rod 58 is moved backward, swinging lever 54 and moving the clutch member 42 backward out of engagement with the clutch member 41. The brake members are thus released and fall in front of the wheels, which tend to ride up thereon and transfer the weight of the vehicle thereto, stopping the latter almost instantly. The brake members can also be released by the driver of the vehicle by depressing the foot pedal 60 and operating lever 54. To restore the brake members to their normal position the handle 49 is pulled, rotating shaft 46, from which motion is transmitted to the shafts 24, 25 on which the arms 22, 23 which support the brake members are fixed. After the brake members have been raised the lock 50 is set, holding the brake members in raised position.

Lever 49 may be locked by any commercial padlock, when the brake members are lowered, to prevent theft of the vehicle.

While I have shown and described a preferred embodiment of my improved quick stop emergency brake for vehicles it is to be understood that I do not limit myself to the precise construction herein disclosed, and the right is reserved to the use of the rear brakes without the use of the front brake element and to all changes and modifications coming within the scope of the invention as defined in the appended claims.

Having thus described my invention what I claim as new and desire to protect by Letters Patent of the United States is as follows:

1. In combination with a vehicle, brake members arranged in pairs and adapted to engage the ground in front of the wheels of the vehicle, bodily movable shafts from which said brake members are suspended, arms carrying said shafts, transverse shafts on which said arms are fixed, front and rear longitudinal shafts having bevel gear connections with the said transverse shafts, said front longitudinal shaft being formed in two sections, a clutch connecting said sections, means operatively connected to one section of said shaft for raising and holding in raised position said brake members, the other section of said shaft having the above mentioned gear connection with the transverse shaft, means operatively connecting the last mentioned section of the front longitudinal shaft with the rear longitudinal shaft whereby the latter is caused to operate and means for releasing said clutch to free the said transverse shafts.

2. In combination with a vehicle, brake members arranged in pairs and adapted to engage the ground in front of the wheels of the vehicle, bodily movable shafts from which said brake members are suspended, arms carrying said shafts, transverse shafts on which said arms are fixed, front and rear longitudinal shafts having bevel gear connections with the said transverse shafts, said front longitudinal shaft being formed in two sections, a clutch uniting said sections, means operatively connected to one section of said shaft for raising and holding in raised position said brake members the other section of said shaft having the said gear connection with the transverse shaft, means operatively connecting the last mentioned section of the front longitudinal shaft with the rear longitudinal shaft whereby the latter is caused to operate, a lever engaging said clutch to release the same and free the said transverse shafts, and a bumper bar and foot pedal operatively engaged with said lever.

3. In combination with a vehicle, brake members arranged in pairs and adapted to engage the ground in front of the wheels of the vehicle, bodily movable shafts from which said brake members are suspended, arms carrying said shafts, transverse shafts on which said arms are fixed, front and rear longitudinal shafts having bevel gear connections with the said transverse shafts, said front longitudinal shaft being formed in two sections, a clutch connecting said sections, means operatively connected to one section of said shaft for raising and holding in raised position said brake members, the other section of said shaft having the above mentioned gear connection with the transverse shaft, means for releasing said clutch to free the said transverse shafts, and a third longitudinal shaft having gear connections with each of said front and rear shafts to cause the same to operate in unison.

In testimony whereof I have affixed my signature.

JACOB HOCHMAN.